United States Patent
Peterson et al.

(10) Patent No.: US 10,182,416 B2
(45) Date of Patent: Jan. 15, 2019

(54) AUTOMATICALLY MODIFYING NOTIFICATIONS BASED ON DISTANCE FROM A PAIRED WEARABLE SMART DEVICE

(71) Applicant: Lenovo Enterprise Solutions (Singapore) Pte. Ltd., Singapore (SG)

(72) Inventors: Nathan J. Peterson, Durham, NC (US); Amy L. Rose, Chapel Hill, NC (US); Gary D. Cudak, Wake Forest, NC (US); John S. Crowe, Durham, NC (US); Bryan L. Young, Tualatin, OR (US); Jennifer J. Lee-Baron, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 32 days.

(21) Appl. No.: 15/157,019

(22) Filed: May 17, 2016

(65) Prior Publication Data
US 2017/0339663 A1    Nov. 23, 2017

(51) Int. Cl.
*H04W 68/00* (2009.01)
*H04W 4/02* (2018.01)
*H04M 1/725* (2006.01)
*H04W 84/12* (2009.01)
*H04W 4/80* (2018.01)

(52) U.S. Cl.
CPC ....... *H04W 68/005* (2013.01); *H04M 1/7253* (2013.01); *H04W 4/023* (2013.01); *H04W 4/80* (2018.02); *H04W 84/12* (2013.01)

(58) Field of Classification Search
CPC ........ G01B 21/16; G06F 21/35; H04W 4/008; H04W 4/003; H04W 4/023; H04L 63/0853
See application file for complete search history.

(56) References Cited

U.S. PATENT DOCUMENTS

2014/0334271 A1* 11/2014 Park .................. G04G 21/04
368/10
2018/0249435 A1* 8/2018 Yu ..................... H04L 29/08

OTHER PUBLICATIONS

David Pierce, "Google'S Smartwatches Now Let You Leave Your Phone at Home", http://www.wired.com/2015/04/android-wear-wife-emoji/, David Pierce Gear, Apr. 20, 2015, pp. 1-5.
(Continued)

*Primary Examiner* — Liton Miah
(74) *Attorney, Agent, or Firm* — Jeffrey L. Streets

(57) ABSTRACT

A method of management notifications on a mobile communication device includes pairing a wearable smart device with the mobile communication device, and automatically disabling notifications on the mobile communication device in response to determining that the paired wearable smart device has moved away from the mobile communication device. For example, the mobile communication device may be a smartphone and the wearable smart device may be a smartwatch. Optionally, the mobile communication device and the wearable smart device may pair using a wireless personal area network standard, such as Bluetooth™, and may also communicate using a wireless local area network, such as Wi-Fi™.

11 Claims, 4 Drawing Sheets

(56) References Cited

OTHER PUBLICATIONS

Android Developers, "Notifications", http://developer.android.com/design/patterns/notifications.html, May 1, 2016, pp. 1-10.
ondik05, "How to Silence My Phone (N6) But Have the Watch Vibrate?", (self.AndroidWear), https://www.reddit.com/r/AndroidWear/comments/3au3ti/how_to_silen . . . , Mar. 11, 2016, 3 pages.

* cited by examiner

AUTOMATICALLY MODIFYING NOTIFICATIONS BASED ON DISTANCE FROM A PAIRED WEARABLE SMART DEVICE

BACKGROUND

Field of the Invention

The present invention relates to methods of managing notification settings of a mobile device, such as a smartphone.

Background of the Related Art

Modern mobile communication devices, such as smartphones, run applications or "apps" that provide one or more service. Many such applications will cause the mobile communication device to display notifications according to previous user input. For example, a user may enter various events into a calendar application, such that the calendar application may generate a notification reminding the user about the event. Similarly, a power monitoring application may generate a notification in response to detecting that the battery level within the mobile communication device or other device has fallen below a certain level. Other applications will display notifications pushed to the application by a third party service. For example, a weather service may push a current thunderstorm warning to a related weather application that will cause the mobile communication device to display a corresponding weather notification. A notification may take various forms, such as an interactive banner that will go away quickly unless acted upon or an interactive alert that requires a user to act upon the alert before moving on to other tasks on the mobile communication device. Notifications are a helpful feature of many applications and a user is generally able to modify settings that customize the way that notifications are handled. However, the frequency and timing of notifications can become troubling to some users.

A smartwatch is a wearable computer having the form factor of a wristwatch. The range of smartwatches currently available may include a wide variety of features and capabilities, including the ability to run applications and communicate with external devices using wireless technology standards like Bluetooth™ (wireless personal area networking) and Wi-Fi™ (wireless local area networking). Although a smartwatch may be used independently, the utility of the smartwatch can be enhanced through pairing with a smartphone. Once paired, the smartphone and smartwatch can cooperate in various ways. For example, an application on the smartphone may cause notifications and/or their actions to be bridged over to the smartwatch by default.

BRIEF SUMMARY

One embodiment of the present invention provides a method comprising pairing a wearable smart device with a mobile communication device, and automatically disabling notifications on the mobile communication device in response to determining that the paired wearable smart device has moved away from the mobile communication device.

Another embodiment of the present invention provides a computer program product comprising a non-transitory computer readable storage medium having program instructions embodied therewith, the program instructions being executable by a processor to cause the processor to perform a method. The method comprises pairing a wearable smart device with a mobile communication device, and automatically disabling notifications on the mobile communication device in response to determining that the paired wearable smart device has moved away from the mobile communication device.

DETAILED DESCRIPTION

Figure 1:
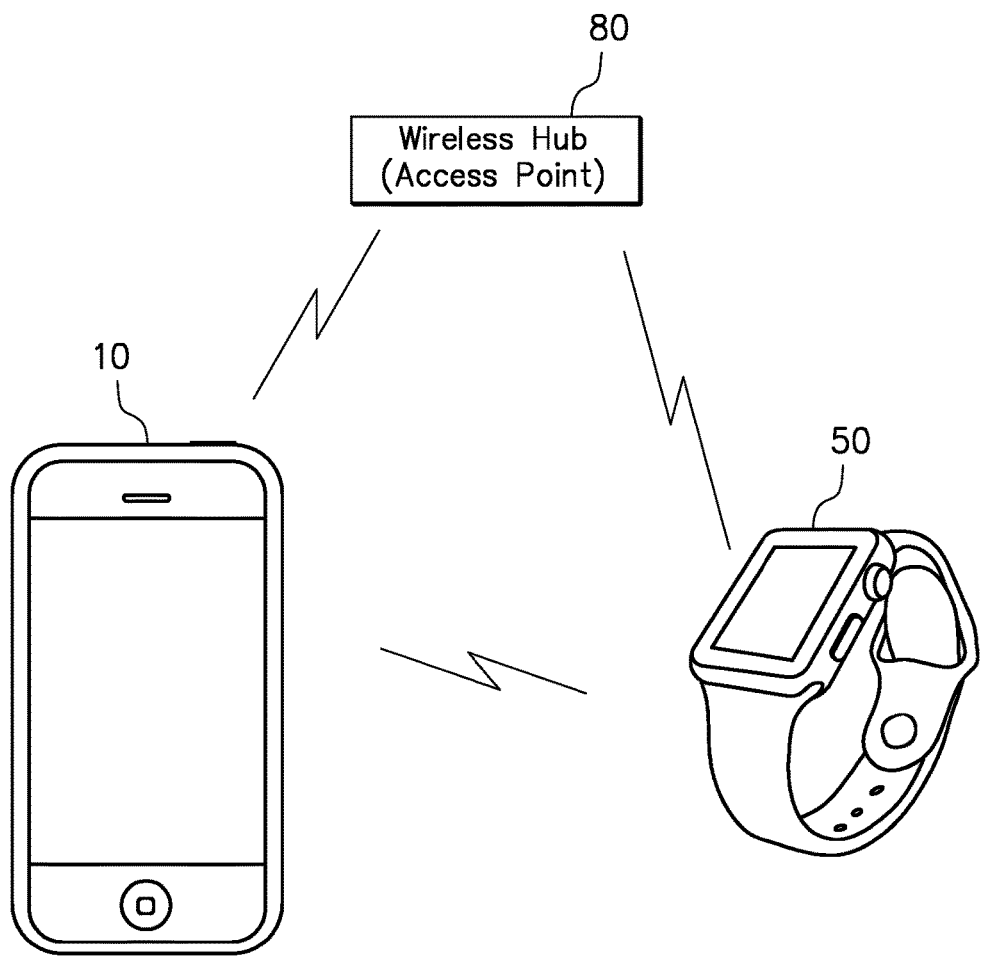
FIG. 1 is a system diagram of a mobile communication device and a wearable smart device that can communicate directly or through a wireless hub.

One embodiment of the present invention provides a method comprising pairing a wearable smart device with a mobile communication device, and automatically disabling notifications on the mobile communication device in response to determining that the paired wearable smart device has moved away from the mobile communication device.

The wearable smart device may be any wearable electronic device that has wireless communication capabilities compatible with the mobile communication device. Since the wearable smart device is expected to be worn by the user, movement of the wearable smart device away from the mobile communication device is interpreted as indicating that the user has moved away from the mobile communication device. The methods of the present invention include automatically disabling notifications on the mobile communication device in a manner consistent with the user having temporarily left their mobile communication device unattended.

The types of notifications that may be available on a mobile communication device, either at the present time or in the future, may be dependent upon the capabilities of the mobile communication device or other paired devices. Similarly, the types of notifications that may be automatically disabled is not limited. However, the notifications may be selected from audible alerts, vibration alerts, and display alerts. Audible and vibration alerts may perhaps be disabled to avoid annoying other nearby users, whereas display alerts may be disabled for the purpose of protecting privacy.

There are various ways of determining that the wearable smart device has moved away from the mobile communication device. For example, it may be determined that the wearable smart device has moved away from the mobile communication device by determining that a distance between the wearable smart device and the mobile communication device is greater than a predetermined distance. In another example, it may be determined that the wearable smart device has moved away from the mobile communication device in response to detecting a reduction in the signal strength of a Bluetooth signal between the mobile communication device and the wearable smart device. Optionally, the distance between the devices may be measured in ranges, such as "immediate", "near", and "far". Similarly, it may be determined that the wearable smart device has moved away from the mobile communication device in response to detecting an increasing difference between a Wi-Fi signal strength detected by the mobile communication device and a Wi-Fi signal strength detected by the wearable smart device.

In a further example, it may be determined that the paired wearable smart device has moved away from the mobile communication device by determining that the wearable smart device is out of range of a Bluetooth signal of the mobile communication device while being accessible via Wi-Fi. Bluetooth signals are currently limited to around 30 feet. In this example, the method may further include the mobile communication device and the wearable smart device communicating over Wi-Fi to determine whether both the mobile communication device and the wearable smart device have Bluetooth communication enabled. If either device has Bluetooth communication disabled, then a lack of Bluetooth communication does not indicate that the wearable smart device is out of range of a Bluetooth signal of the mobile communication. Therefore, a determination that the wearable smart device is out of range of a Bluetooth signal of the mobile communication device while being accessible via Wi-Fi, may include determining that both the mobile communication device and the wearable smart device have Bluetooth communication enabled.

Various embodiments of the method may further comprise automatically re-enabling notifications on the mobile communication device in response to one or more determinations. In one example, notifications may be automatically re-enabled in response to determining that the wearable smart device is within a predetermined distance of the mobile communication device and determining that notifications are currently disabled as a result of previously determining that the wearable smart device had moved away from the mobile communication device. This situation is consistent with the user returning into Bluetooth range of the mobile communication device after having just stepped out of range. Optionally, the wearable smart device may be determined to be within a predetermined distance of the mobile communication device in response to re-establishing a Bluetooth connection between the mobile communication device and the wearable smart device. In another example, notifications may be automatically re-enabled in response to determining that the wearable smart device is no longer being worn by a user. This situation is consistent with the possibility that the user has returned into the area near the mobile communication device without the wearable smart device. A wearable smart device may determine whether or not it is being worn in various manners, such as by detecting movement, a pulse, or light reflection (photoplethysmography). In a further example, notifications may be automatically re-enabled in response to determining that the mobile communication device and wearable smart device are unable to communicate over both Bluetooth and Wi-Fi. This situation is consistent with the wearable smart device being turned off or running out of battery power.

In one specific example of an implementation of the present invention, a person having a mobile phone and wearing a smartwatch paired with the mobile gets up from their desk and walks away. If the mobile phone is left unattended at the desk, an incoming phone call will cause the phone to ring audibly. However, since the person has walked away, the person may not hear the ringing yet others nearby may become annoyed at the ringing. Embodiments of the present invention provide a feature of the mobile phone that would automatically turn off the ringer and/or vibrator in response to determining that a paired wearable smart device was greater than a specific distance from the mobile phone. In other words, if the person is far enough away from the mobile phone that the person doesn't hear it ringing, then the ringer is automatically turned off to avoid annoying other people or wasting battery power.

Another embodiment of the present invention provides a computer program product comprising a non-transitory computer readable storage medium having program instructions embodied therewith, the program instructions being executable by a processor to cause the processor to perform a method. The method comprises pairing a wearable smart device with a mobile communication device, and automatically disabling notifications on the mobile communication device in response to determining that the paired wearable smart device has moved away from the mobile communication device.

The foregoing computer program product may further include program instructions for implementing or initiating any one or more aspects of the methods described herein. Accordingly, a separate description of the methods will not be duplicated in the context of a computer program product. It should be recognized that the computer program product may be executed on the mobile communication device, such that the mobile communication device disables its own notifications (ringer, vibrator, and/or display) in response to a currently paired wearable device being a predetermined distance away.

FIG. 1 is a system diagram of a mobile communication device 10 and a wearable smart device 50 that can communicate directly or through a wireless hub 80. Embodiments of the present invention may use a Bluetooth™ standard for establishing a wireless personal area network (WPAN) between the mobile communication device 10 and the wearable smart device 50. Embodiments of the present invention may also use a Wi-Fi™ standard for establishing a wireless local area network (WLAN) that allows the mobile communication device 10 and the wearable smart device 50 to communicate via the wireless hub 80. In many implementations, the wireless hub 80 may be a wireless access point (WAP). In a non-limiting example, a Bluetooth™ signal may have a range of about 30 feet and a Wi-Fi™ signal may have a range of about 100 feet, depending upon the transmission power or the antenna type.

Figure 2:
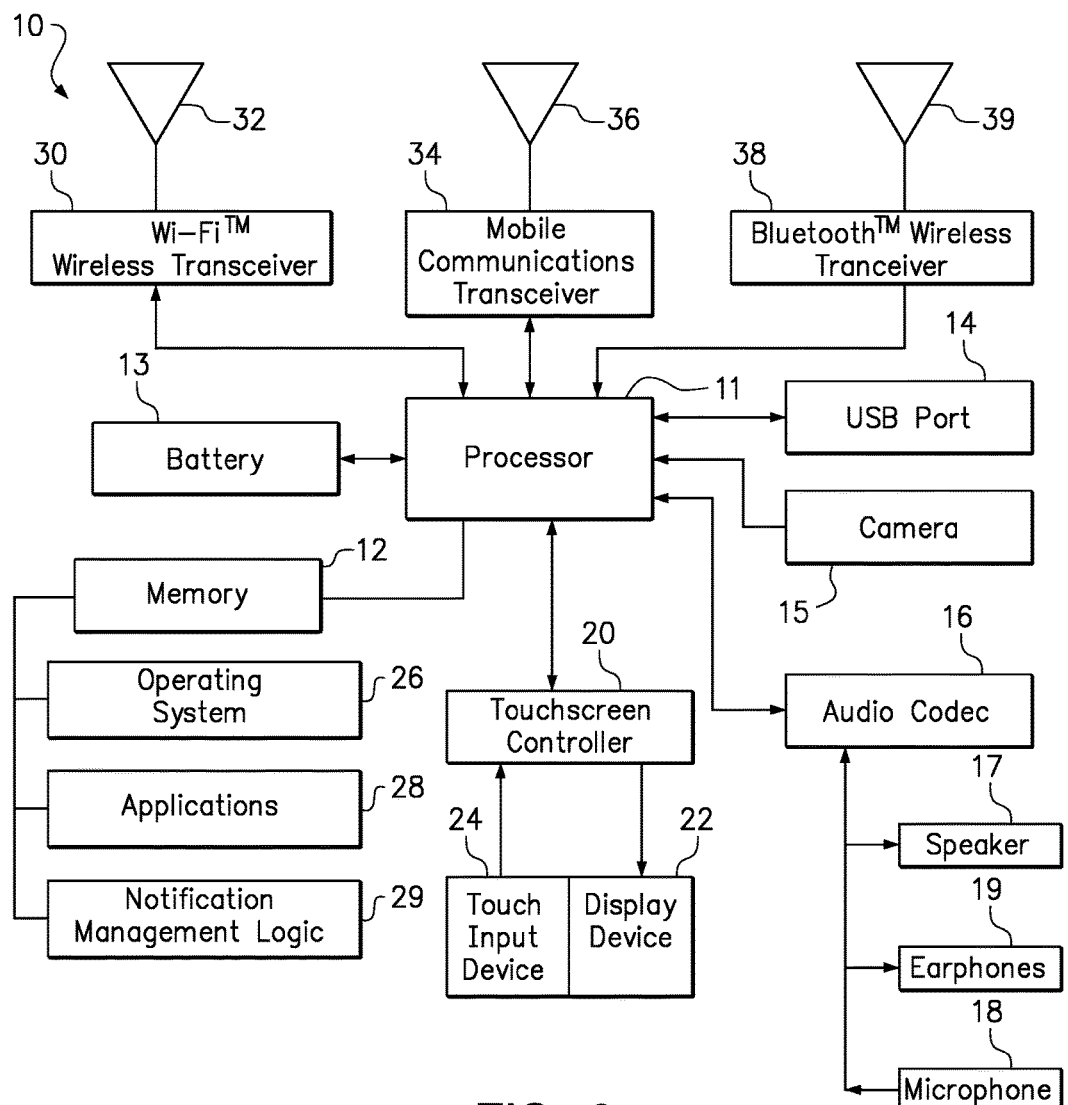
FIG. 2 is a diagram of a smartphone.

FIG. 2 is a diagram of a mobile communication device in the form of a smartphone 10 capable of implementing methods of the present invention. The smartphone 10 may include a processor 11, memory 12, a battery 13, a universal serial bus (USB) port 14, a camera 15, and an audio codec 16 coupled to a built-in speaker 17, a microphone 18, and an earphone jack 19. The smartphone 10 may further include a touchscreen controller 20 which provides a graphical output to the display device 22 and an input from a touch input device 24. Collectively, the display device 22 and touch input device 24 may be referred to as a touchscreen. The touchscreen may be in either a locked condition or an unlocked condition. The touchscreen is fully functional in the unlocked condition, but, when the touchscreen is in the locked condition, the touch input device 24 will ignore all attempted input other than a specific unlocking gesture.

The smartphone 10 may also include a Wi-Fi™ wireless transceiver 30 and corresponding antenna 32, a cellular communications transceiver 34 and corresponding antenna 36, and a Bluetooth™ wireless transceiver 38 and corresponding antenna 39. Accordingly, the Bluetooth™ wireless transceiver 38 enables communication between the smartphone 10 and the wearable smart device 50 (See FIG. 1). In order to implement one or more embodiment of the present invention, the memory 12 may include an operating system 26, various applications 28, and notification management logic 29.

It should be recognized that certain steps of the present invention are executed by the mobile communication device, such as the smartphone 10, and certain other steps of the present invention are executed by the wearable smart device 50, such as a smartwatch. Accordingly, each device may store that portion of the notification management logic 29 for which the respective device is responsible.

Figure 3:
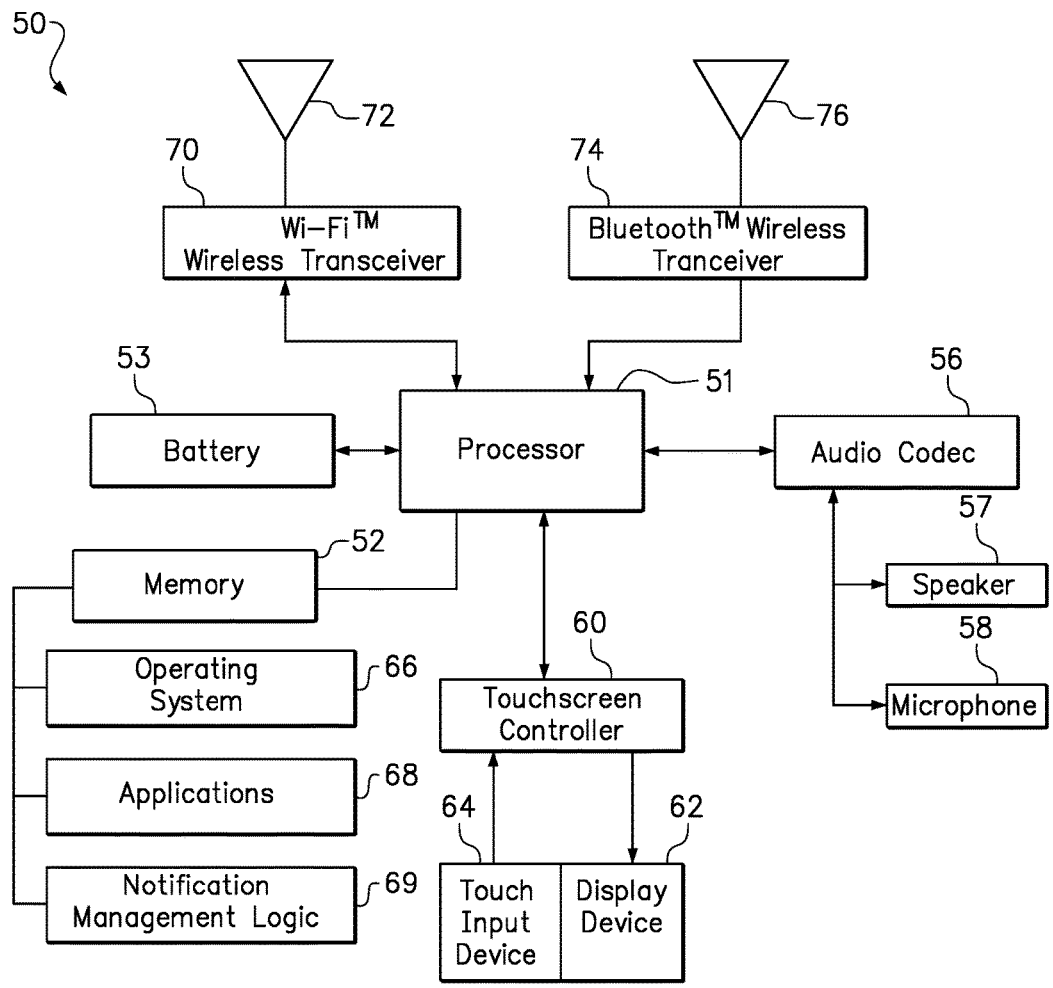
FIG. 3 is a diagram of a wearable smart device.

FIG. 3 is a diagram of a wearable smart device 50 consistent with methods of the present invention. The smartphone 50 may include a processor 51, memory 52, a battery 53, and an audio codec 56 coupled to a built-in speaker 57 and a microphone 58. The smartphone 50 may further include a touchscreen controller 60 which provides a graphical output to the display device 62 and an input from a touch input device 64. Collectively, the display device 62 and touch input device 64 may be referred to as a touchscreen. The touchscreen may be in either a locked condition or an unlocked condition. The touchscreen is fully functional in the unlocked condition, but, when the touchscreen is in the locked condition, the touch input device 64 will ignore all attempted input other than a specific unlocking gesture.

The smartphone 50 may also include a Wi-Fi™ wireless transceiver 70 and corresponding antenna 72, and a Bluetooth™ wireless transceiver 74 and corresponding antenna 76. Accordingly, the Bluetooth™ wireless transceiver 74 enables communication between the smartphone 10 and the wearable smart device 50 (See FIG. 1). In order to implement one or more embodiment of the present invention, the memory 52 may include an operating system 66, various applications 68, and notification management logic 69.

Figure 4:
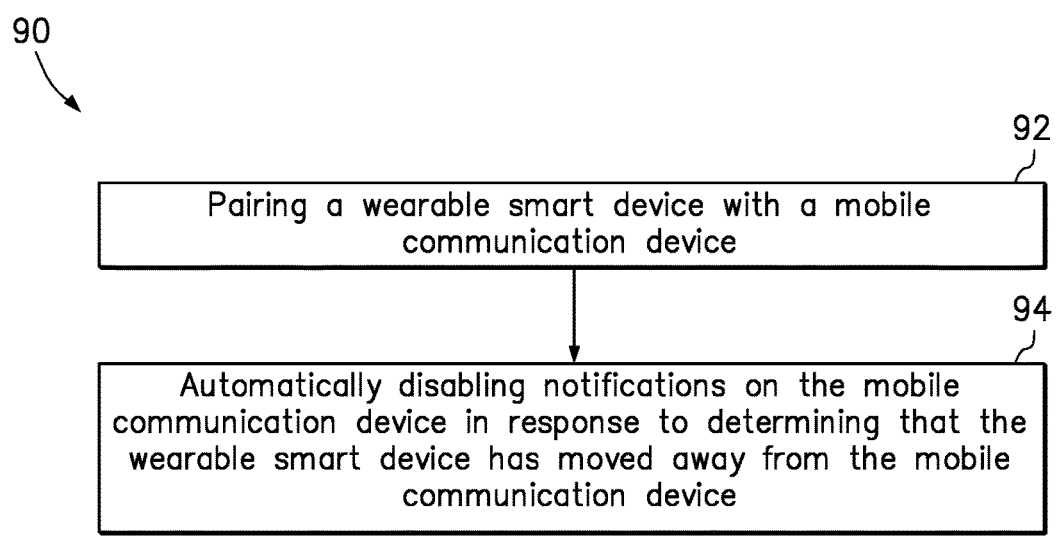
FIG. 4 is a flowchart of a method according to one embodiment of the present invention.

FIG. 4 is a flowchart of a method 90 according to one embodiment of the present invention. In step 92, the method includes pairing a wearable smart device with a mobile communication device. In step 94, the method includes automatically disabling notifications on the mobile communication device in response to determining that the wearable smart device has moved away from the mobile communication device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    pairing a wearable smart device with a mobile communication device;
    determining whether the wearable smart device has moved away from the mobile communication device including determining that the wearable smart device is out of range of a wireless personal area network signal of the mobile communication device while being accessible to the mobile communication device via a wireless local area network;
    the mobile communication device and the wearable smart device communicating over a wireless local area network to determine whether both the mobile communication device and the wearable smart device have wireless personal area network communication enabled; and
    automatically disabling notifications on the mobile communication device in response to determining that the wearable smart device has moved away from the mobile communication device.

2. The method of claim 1, wherein determining that the wearable smart device is out of range of a wireless personal area network signal of the mobile communication device while being accessible via the wireless local area network, includes determining that both the mobile communication device and the wearable smart device have wireless personal area network communication enabled.

3. The method of claim 1, wherein the notifications are selected from audible alerts and vibration alerts.

4. The method of claim 1, further comprising:
    automatically re-enabling notifications on the mobile communication device in response to determining that the wearable smart device is within a predetermined distance of the mobile communication device and determining that notifications are currently disabled as a result of previously determining that the wearable smart device had moved away from the mobile communication device.

5. The method of claim 4, wherein determining that the wearable smart device is within a predetermined distance of the mobile communication device, includes re-establishing a wireless personal area network connection between the mobile communication device and the wearable smart device.

6. The method of claim 1, further comprising:
    automatically re-enabling notifications on the mobile communication device in response to determining that the wearable smart device is no longer being worn by a user.

7. The method of claim 1, further comprising:
    automatically re-enabling notifications on the mobile communication device in response to determining that the mobile communication device and wearable smart device are unable to communicate over both the wireless personal area network and the wireless local area network.

8. A computer program product comprising a non-transitory computer readable storage medium having program instructions embodied therewith, the program instructions executable by a processor to:
    pair a wearable smart device with a mobile communication device;
    determine whether the wearable smart device has moved away from the mobile communication device including a determination that the wearable smart device is out of range of a wireless personal area network signal of the mobile communication device while being accessible to the mobile communication device via a wireless local area network;
    determine, via communication between the mobile communication device and the wearable smart device over the wireless local area network, whether both the mobile communication device and the wearable smart device have wireless personal area network communication enabled; and
    automatically disable notifications on the mobile communication device in response to determining that the wearable smart device has moved away from the mobile communication device.

9. The computer program product of claim 8, wherein the program instructions executable by a processor to determine that the wearable smart device is out of range of a wireless personal area network signal of the mobile communication device while being accessible via the wireless local area network include program instructions executable by a processor to determine that both the mobile communication device and the wearable smart device have wireless personal area network communication enabled.

10. The computer program product of claim 8, the program instructions further executable by a processor to:
automatically re-enable notifications on the mobile communication device in response to determining that the wearable smart device is within a predetermined distance of the mobile communication device and determining that notifications are currently disabled as a result of previously determining that the wearable smart device had moved away from the mobile communication device.

11. A computer program product comprising a non-transitory computer readable storage medium having program instructions embodied therewith, the program instructions executable by a processor to:
pair a wearable smart device with a mobile communication device;
determine whether the wearable smart device has moved away from the mobile communication device including detecting an increasing difference between a wireless local area network signal strength detected by the mobile communication device and a wireless local area network signal strength detected by the wearable smart device;
determine, via communication between the mobile communication device and the wearable smart device over the wireless local area network, whether both the mobile communication device and the wearable smart device have wireless personal area network communication enabled; and
automatically disable notifications on the mobile communication device in response to determining that the wearable smart device has moved away from the mobile communication device.

* * * * *